April 21, 1953     C. ASARO     2,635,629
EXCESS FLOW CUTOFF VALVE
Filed Jan. 16, 1951
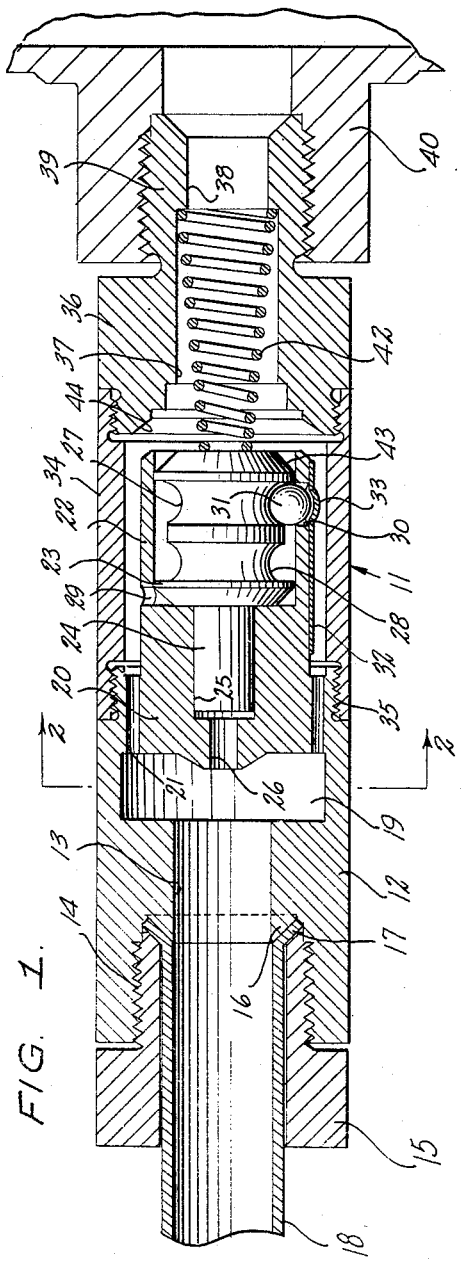
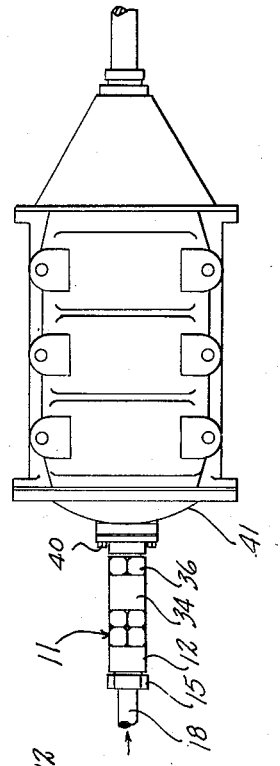
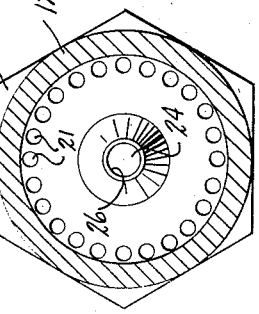
INVENTOR.
CARMELO ASARO,
BY
McMorrow, Berman & Davidson
ATTORNEYS.

Patented Apr. 21, 1953

2,635,629

UNITED STATES PATENT OFFICE 2,635,629

EXCESS FLOW CUTOFF VALVE

Carmelo Asaro, Rome, Italy

Application January 16, 1951, Serial No. 206,173
In Italy February 8, 1950

1 Claim. (Cl. 137—517)

This invention relates to safety valve devices, and more particularly to an automatic safety valve device adapted to be placed in a line between a source of fluid under pressure and an apparatus adapted to be actuated by the fluid, the valve device being arranged so as to close automatically when the line between the valve device and the device actuated by fluid is open or ruptured, thereby preventing free escape of fluid from the fluid pressure source.

A main object of the invention is to provide a novel and improved safety valve device which is simple in construction, which is automatic in operation, and which is reliable in action.

A further object of the invention is to provide an improved automatic safety valve device for use in fluid pressure lines to automatically close a line in the event that the connection to a device to be actuated is open or is ruptured, or if the device to be actuated is damaged, whereby the escape of fluid from the fluid pressure source is prevented, said device being very inexpensive to manufacture, involving relatively few parts, being sturdy in construction, and being arranged to automatically lock in closed condition when a substantial unbalance of fluid pressure occurs at opposite sides of the valve device.

Further objects and advantages of the invention will become apparent from the following description and claim, and from the accompanying drawings, wherein:

Figure 1 is a longitudinal cross-sectional view taken through an improved safety valve device constructed in accordance with the present invention;

Figure 2 is a cross-sectional, detail view taken on line 2—2 of Figure 1;

Figure 3 is a fragmentary elevational view showing the valve device connected in the supply line leading to a pressure tank.

Referring to the drawings, the safety valve device is designated generally at 11 and comprises a main body 12 which is formed with a fluid intake bore 13 and which is formed adjacent the bore 13 with internal threads 14 adapted to threadedly receive a gland nut 15, as shown in Figure 1. The body 12 is formed at the end of bore 13 with the annular, conical seat 16 against which the flared end 17 of a fluid pressure conduit 18 is adapted to be sealingly clamped by the gland nut 15, as shown in Figure 1. The body 12 is formed at the inner end of bore 13 with an enlarged cavity 19 and with a transverse wall portion 20 beyond the cavity 19. The wall 20 is formed with the longitudinally extending, circularly arranged passages 21. As shown in Figure 1, the wall member 20 extends a substantial distance along the axis of the body 12 and is formed at its outer end with a sleeve portion 22 in which is slidably positioned a plunger 23. The plunger 23 is formed with an axial stem portion 24 which is slidably received in a bore 25 formed in the wall 20, said bore 25 communicating with a smaller bore 26 which opens into the cavity 19. The main body of the plunger 23 is formed with a pair of annular grooves 27 and 28, as shown. At its left end, as viewed in Figure 1, the sleeve 22 is formed with a vent opening 29 to allow free movement of fluid into and out of the sleeve 22 when the plunger 23 is moved longitudinally in said sleeve member. Adjacent its right end portion, as viewed in Figure 1, the sleeve 22 is formed with an opening 30 in which is positioned a ball 31, said ball being receivable in the groove 27 when the plunger 23 is in the position shown in Figure 1. Designated at 32 is a leaf spring which is secured to the member 20 and which extends along the sleeve portion 22, the leaf spring 32 being free to flex at the portion thereof which extends adjacent the sleeve 22, but being rigidly secured to the member 20 at the left end of the leaf spring, as viewed in Figure 1. The leaf spring 32 is formed with a recess 33 which is in registry with the opening 30 of sleeve 22 and which receives the ball 31.

Designated at 34 is a cylindrical member which is threadedly secured at 35 to the right end of the body 12, as viewed in Figure 1, and which surrounds the sleeve 22. Designated at 36 is a plug member which is threadedly secured in the right end of the member 34, as viewed in Figure 1, said plug member 36 being formed with a main axial bore 37 and a reduced bore 38 connecting with the bore 37. The plug member 36 has a reduced, externally threaded end portion 39 which contains the reduced bore portion 38 and which may be threadedly secured to the fluid intake conduit element 40 of a device to be supplied with fluid pressure, as for example, a pressure tank 41, shown in Figure 3, or any other suitable utilization device. Designated at 42 is a coil spring which is positioned in the bore 37 and which bears at one end on the plug 23 and at its other end on the annular shoulder defined between bore 37 and the reduced bore 38.

Under normal conditions, the fluid pressures on the inlet side and the outlet side of plunger member 23 are substantially equal, and the spring 42 will exert a thrust on the plunger 23 which maintains the plunger in the position shown in Figure 1, wherein the ball 31 is lockingly engaged in the groove 27 and wherein fluid may freely flow from the conduit 18 through the bore 13 and the space 19 into the passages 21, and thence through the member 34 and the plug member 36 into the conduit portion 40. When a break occurs in the conduit portion 40 or in the tank or other fluid pressure utilization device 41, the pressure in the conduit portion 40 drops considerably, causing a substantial unbalance in pressures on the opposite sides of the plunger 23. The fluid pressure acting on the left side of the plug member 23, as viewed in Figure 1, will force the plunger member to the right, against the restraint imposed thereon by the spring 42 and against the locking pressure exerted by leaf spring 32 and ball 31 on the plunger member 23. The fluid pressure acting on the plunger 23 overcomes the restraint on the plunger member and moves the plunger member to the right, as viewed in Figure 1, causing the beveled right end portion 43 of the plunger member to seat in a conical recess 44 around the intake end of the bore 37. As the plunger member 23 moves into seating position on the conical surface of the recess 44, the ball 31 lockingly engages in the groove 28 and cooperates with the fluid pressure acting on the left end of the plunger 23 to hold the plunger in sealing relation with plug 36 against the pressure of the spring 42. This seals the connection between the supply conduit 18 and the outlet conduit element 40 until the break or rupture in the utilization line or device has been repaired. When pressure has been restored on the outlet side of the valve device, the plunger 23 is moved by the spring 42 into its normal position, shown in Figure 1, whereby fluid may freely flow from the inlet conduit to the outlet conduit element 40 and to the valve device.

It will be apparent from the above description that the valve device functions to automatically close the line in the event that any damage occurs in the conduits or in the apparatus connected to the outlet side of the valve device, thereby preventing the free escape of the pressure fluid.

While a specific embodiment of an improved safety valve device has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A safety valve of the character described comprising a cylinder having an inlet port at one end and an outlet port at the other end, a transverse wall member in said cylinder, a plunger member slidably mounted in said wall member for movement axially in said cylinder, said transverse wall member being with longitudinal apertures around said plunger member, said plunger member being movable into sealing engagement with said outlet port when the fluid pressure on the inlet side of the plunger member is substantially greater than the pressure at the outlet side thereof, springs means acting between the outlet port and the plunger member and biasing the plunger member away from the outlet port, said plunger member being formed with a pair of annular grooves, a longitudinally extending leaf spring secured to said wall member, said leaf spring being formed with a recess, a sleeve element on said wall member surrounding the plunger member inwardly of said apertures, said sleeve element being formed with an opening registering with said recess, a ball detent seated in said opening and engaging the recess in the leaf spring and being lockingly engageable with the annular grooves on said plunger member, said ball detent being arranged to normally engage the groove closest to the outlet side of the plunger member to yieldably hold the plunger member away from the outlet port but being arranged to lockingly engage with the remaining groove when the plunger member moves into engagement with the outlet port, said plunger member being arranged to move into engagement with the outlet port when the fluid pressure at the inlet side of the plunger member substantially exceeds the pressure on the outlet side thereof.

CARMELO ASARO.

References Cited in the file of this patent

UNITED STATES PATENTS

| Number | Name | Date |
|---|---|---|
| 2,127,849 | Stone | Aug. 23, 1938 |
| 2,179,144 | Buttner | Nov. 7, 1939 |
| 2,512,190 | Waterman | June 20, 1950 |